(12) United States Patent
Maruta et al.

(10) Patent No.: US 7,179,564 B2
(45) Date of Patent: Feb. 20, 2007

(54) CADMIUM NEGATIVE ELECTRODE AND NICKEL CADMIUM STORAGE BATTERY INCLUDING THE SAME

(75) Inventors: Masayoshi Maruta, Wakayama (JP); Mika Morita, Wakayama (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 430 days.

(21) Appl. No.: 10/301,310

(22) Filed: Nov. 21, 2002

(65) Prior Publication Data

US 2003/0104271 A1 Jun. 5, 2003

(30) Foreign Application Priority Data

Nov. 21, 2001 (JP) ............................. 2001-355832

(51) Int. Cl.
*H01M 4/00* (2006.01)
*H01M 2/16* (2006.01)
*H01M 4/62* (2006.01)
*B05D 5/12* (2006.01)

(52) U.S. Cl. .................. 429/222; 429/137; 429/232; 427/58

(58) Field of Classification Search .............. 429/137, 429/245, 234, 222, 232; 427/58; 205/271
See application file for complete search history.

(56) References Cited

U.S. PATENT DOCUMENTS 4,990,414 A * 2/1991 Matsui et al. ............... 429/217

FOREIGN PATENT DOCUMENTS

JP 05-283067 A 10/1993
JP 2001-357842 * 12/2001

* cited by examiner

*Primary Examiner*—Patrick Joseph Ryan
*Assistant Examiner*—Thomas H. Parsons
(74) *Attorney, Agent, or Firm*—Akin Gump Strauss Hauer & Feld, LLP

(57) ABSTRACT

A cadmium negative electrode for a nickel cadmium storage battery, the electrode comprising an electrode plate and a resin layer coating at least one surface of the electrode plate, the electrode plate comprising a cadmium compound as an active material, the resin layer comprising polyvinyl pyrrolidone and a product of an addition reaction of a styrylpyridinium salt to polyvinyl alcohol.

5 Claims, 3 Drawing Sheets

CADMIUM NEGATIVE ELECTRODE AND NICKEL CADMIUM STORAGE BATTERY INCLUDING THE SAME

BACKGROUND OF THE INVENTION

Nickel cadmium storage batteries, having excellent characteristics such as good high-rate discharge characteristics and long charge/discharge cycle life, find extensive application ranging from commercial small-sized appliances to space development, although the currently dominant secondary batteries are lithium secondary batteries and nickel-metal hydride storage batteries.

In nickel cadmium storage batteries, however, a negative electrode active material is repeatedly dissolved and precipitated with charge and discharge. With this repetition, a phenomenon called "migration", in which cadmium is precipitated to accumulate in pores of a separator, proceeds. The migration occasionally causes short-circuit of a positive electrode and a negative electrode.

Such migration occurs more remarkably particularly in batteries comprising a paste-type negative electrode, which enables low-cost production of high energy-density batteries and has therefore become mainstream in recent years, than in batteries comprising a conventional sintered-type negative electrode. This is ascribed to the fact that the sintered-type negative electrode has an active material carried in a matrix of sintered metal while the paste-type negative electrode uses an organic material for binding active material particles and has no matrix. Since such an organic material is subject to oxidation and decomposition as the battery charge/discharge cycle proceeds, it becomes unable to perform its function of holding the active material particles in the electrode plate. This is the main cause of the migration. Also, the migration is accelerated when the active material is filled into the negative electrode at a higher density in order to heighten the battery capacity. This is because the total change of the active material volume in charge and discharge becomes large.

In an attempt to prevent the short-circuit caused by the migration, Japanese Laid-Open Patent Publication No. Hei 5-283067 proposes formation of a mixed resin layer comprising polyvinyl pyrrolidone and polyvinyl alcohol on the surface of a negative electrode. This can prevent diffusion of cadmium, which has dissolved into an electrolyte in charge/discharge reactions, into a separator to some extent.

However, this related art needs to form a thick resin layer on the surface of the negative electrode in order to fully prevent the short-circuit caused by the migration. Formation of such a thick non-conductive film on the negative electrode surface becomes a problem since it lowers the high-rate discharge characteristics of the battery and hinders absorption of oxygen gas in the overcharged battery.

BRIEF SUMMARY OF THE INVENTION

The present invention provides a cadmium negative electrode capable of yielding a nickel cadmium storage battery having an excellent charge/discharge cycle life without forming, on a negative electrode, a thick resin layer which impairs the high-rate discharge characteristics of the battery.

The present invention relates to a cadmium negative electrode for a nickel cadmium storage battery, the cadmium negative electrode comprising an electrode plate and a resin layer coating at least one surface of the electrode plate, the electrode plate comprising a cadmium compound as an active material, the resin layer comprising polyvinyl pyrrolidone and a product of an addition reaction of a styrylpyridinium salt to polyvinyl alcohol.

The use of the cadmium negative electrode of the present invention makes it possible to provide a nickel cadmium storage battery having an excellent cycle life without impairing the high-rate discharge characteristics.

It is preferable that the cadmium negative electrode of the present invention further comprise a conductive layer comprising metallic nickel between the electrode plate and the resin layer.

The present invention also pertains to a method for producing a cadmium negative electrode for a nickel cadmium storage battery, the method comprising: a step (a) of producing an electrode plate comprising a cadmium compound as an active material; a step (b) of preparing an aqueous solution comprising polyvinyl pyrrolidone and a product of an addition reaction of a styrylpyridinium salt to polyvinyl alcohol; and a step (c) of applying the aqueous solution onto at least one surface of the electrode plate or immersing the electrode plate in the aqueous solution.

It is preferable that this production method further comprises a step of forming a conductive layer comprising metallic nickel on at least one surface of the electrode plate by electrolytic plating prior to the step (c).

The present invention also encompasses a nickel cadmium storage battery comprising: a positive electrode comprising nickel; the above-described cadmium negative electrode; a separator interposed between the positive electrode and the negative electrode; and an alkaline electrolyte.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
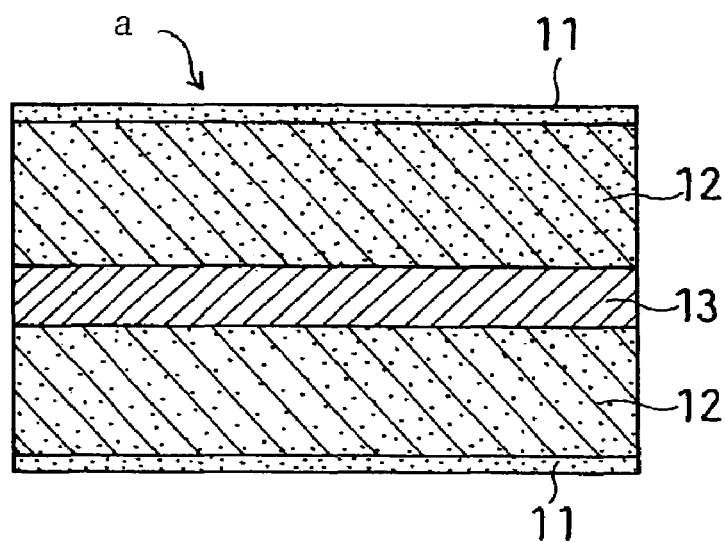
FIG. 1 is a schematic sectional view of a negative electrode "a" in accordance with Example 1 of the present invention.

The cadmium negative electrode of the present invention is mainly characterized in that at least one surface of the electrode plate is coated with a resin layer comprising polyvinyl pyrrolidone and a product of an addition reaction of a styrylpyridinium salt to polyvinyl alcohol. When the surface of the electrode plate is covered with the resin layer comprising polyvinyl pyrrolidone and a product of an addition reaction of a styrylpyridinium salt to polyvinyl alcohol, it is possible to make the resin layer drastically thinner and more durable than the conventional one. The thickness of the resin layer is, for example, from 0.05 to 3 μm, and preferably from 0.1 to 2 µm. Since the resin layer is thin, it does not impair the high-rate discharge characteristics of the battery, but it can suppress dissolution of cadmium into the electrolyte which is associated with charge/discharge cycles. Therefore, it is possible to obtain a nickel cadmium storage battery having a long cycle life according to the present invention.

The whole surface of the negative electrode is preferably coated with the resin layer; however, even when a partial surface of the negative electrode is coated, it is possible to obtain the effect of suppressing the dissolution of cadmium into the electrolyte depending on the coated area.

It is preferable that the cadmium negative electrode of the present invention further comprise a conductive layer comprising metallic nickel between the electrode plate and the resin layer. Formation of the conductive layer comprising metallic nickel allows the conductivity of the paste-type negative electrode to be maintained at a high level.

The thickness of the conductive layer comprising metallic nickel is, for example, from 2 to 15 µm, and preferably from 4 to 7 µm.

The amount of the styrylpyridinium salt to be added to polyvinyl alcohol is preferably from 0.5 to 2 mol % of the number of moles of hydroxyl group contained in polyvinyl alcohol, but is not limited to this range.

Also, the amount of the styrylpyridinium salt to be added to polyvinyl alcohol is normally from 5 to 15 parts by weight per 100 parts by weight of polyvinyl alcohol.

The weight ratio of polyvinyl alcohol to polyvinyl pyrrolidone contained in the resin layer is preferably from 10 to 30 parts by weight of polyvinyl alcohol per 100 parts by weight of polyvinyl pyrrolidone.

The number average degree of polymerization of polyvinyl alcohol is preferably from 100 to 10000. Also, the number average degree of polymerization of polyvinyl pyrrolidone is preferably from 100 to 10000. As polyvinyl pyrrolidone, it is possible to use, for example, a polymer of N-vinyl-2-pyrrolidone.

The styrylpyridinium salt is represented by the general formula:

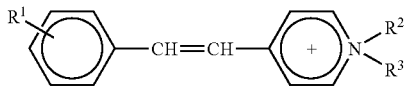

In the general formula, $R^1$ represents a group having a carbonyl group (C=O) and is preferably a formyl group. By reaction of $R^1$ with the hydroxyl group of polyvinyl alcohol, the styrylpyridinium salt is added to polyvinyl alcohol.

$R^2$ and $R^3$ represent independently hydrocarbon groups having a carbon number of from 1 to 3, respectively, and at least one of $R^2$ and $R^3$, in combination with the adjacent six-membered ring (benzene ring), forms an onium salt.

The styrylpyridinium salt may be dimerized by photoreaction. Dimerization of the styrylpyridinium salt can produce the effect of forming a film-like coat on the surface of the negative electrode and therefore preventing separation of negative electrode materials.

The negative electrode of the present invention can be produced, for example, in the following manner.

First, an electrode plate comprising a cadmium compound as an active material is prepared. The electrode plate may be produced in a conventional manner. For example, a negative electrode material paste comprising a cadmium compound is applied onto a core member such as punched metal or lath metal. As the cadmium compound, cadmium oxide having an average particle size of from 0.3 to 1.0 µm is preferably used. The cadmium compound is preferably mixed with metallic cadmium when used.

Next, a resin layer is formed on at least one surface of the electrode plate. The formation of the resin layer is preferably conducted after preparing an aqueous solution containing polyvinyl pyrrolidone and a product of an addition reaction of a styrylpyridinium salt to polyvinyl alcohol. The aqueous solution is applied onto the surface of the electrode plate, or the electrode plate is immersed in the aqueous solution. The aqueous solution is prepared by using proper amounts of the respective resins so as to cause the resultant resin layer to have a desired composition. The total concentration of the resin components in the aqueous solution is preferably from 0.1 to 3.0 wt %.

When a conductive layer comprising metallic nickel is formed between the electrode plate and the resin layer, a step of subjecting the surface of the electrode plate to electrolytic nickel plating is preferably conducted prior to formation of the resin layer on the surface of the electrode plate. The thickness of the conductive layer comprising metallic nickel is preferably from 0.1 to 1.0 µm.

In the following, examples of the present invention will be described.

EXAMPLE 1

FIG. 1 is a schematic sectional view of a cadmium negative electrode produced in this example.

80 parts by weight of cadmium oxide having an average particle size of 0.5 µm and 20 parts by weight of metallic cadmium having an average particle size of 2 µm were mixed with 30 parts by weight of an ethylene glycol solution of polyvinyl alcohol (PVA) having a PVA concentration of 1.5 wt %. The ethylene glycol solution of polyvinyl alcohol contained 1 wt % fiber of a copolymer of acrylonitrile and vinyl chloride as a reinforcing material. This gave a negative electrode material paste.

The paste was applied onto both surfaces of a nickel-plated punched metal 13 having a thickness of 100 µm and was dried to form negative electrode material layers 12. This gave an electrode plate X1. The electrode plate X1 was immersed in an aqueous solution of potassium hydroxide having a specific gravity of 1.23 and a temperature of 30° C. such that cadmium oxide was converted to cadmium hydroxide. This gave an electrode plate X2.

Thereafter, an aqueous solution containing, at 10 wt %, a product of an addition reaction of N-methyl-4-(p-formylstyryl) pyridinium methosulfate (hereinafter referred to as styrylpyridinium methosulfate) to polyvinyl alcohol (number average degree of polymerization: 1700) was prepared. The amount of styrylpyridinium methosulfate to be added to polyvinyl alcohol was 1 part by weight per 10 parts by weight of polyvinyl alcohol.

1 part by weight of the aqueous solution obtained and 4 parts by weight of an aqueous solution containing 30 wt % polyvinyl pyrrolidone (number average degree of polymerization: 1700) were mixed with 95 parts by weight of water to produce a mixed aqueous solution "S".

The above-described electrode plate X2 comprising cadmium hydroxide was immersed in the mixed aqueous solution "S" and was dried to form resin layers 11 having a thickness of from 0.1 to 2 µm on the surfaces of the electrode plate X2. This gave a paste-type cadmium negative electrode "a".

Using the negative electrode "a", a known sintered-type nickel positive electrode, a polypropylene separator and an aqueous solution containing 30 wt % KOH as an alkaline electrolyte, an SC-sized nickel cadmium storage battery "A" having a nominal capacity of 1.4 Ah was produced.

EXAMPLE 2

Figure 2:
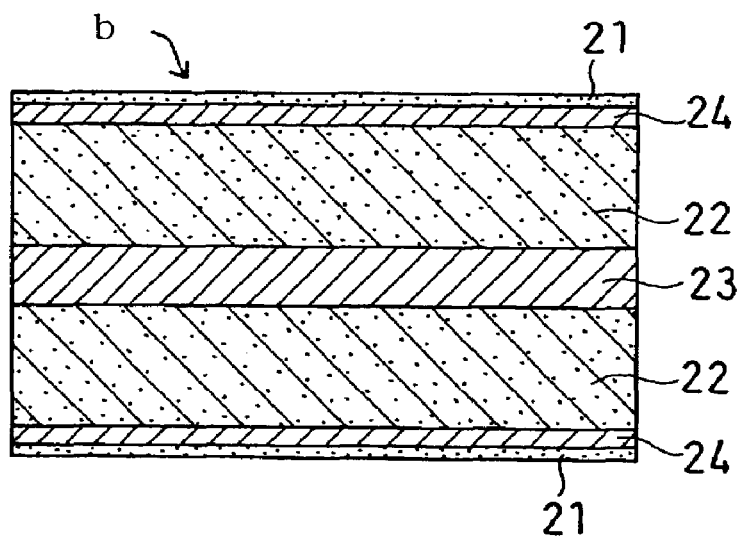
FIG. 2 is a schematic sectional view of a negative electrode "b" in accordance with Example 2 of the present invention.

FIG. 2 is a schematic sectional view of a cadmium negative electrode produced in this example.

An electrode plate X1' comprising a punched metal 23 and negative electrode material layers 22 comprising cadmium oxide, having the same constitution as that of the electrode plate X1 of Example 1, was prepared. Phenoxyacetic acid, which is an aromatic carboxylic acid, was then applied onto the surfaces of the negative electrode material layers 22. Thereafter, the electrode plate X1' was subjected to anodic decomposition in an aqueous solution of nickel sulfate having a nickel ion concentration of 30 g/L, thereby to form porous metallic nickel layers 24 having a thickness of 0.5 µm on the surfaces of the electrode plate X1'. This gave an electrode plate Y1. The electrode plate Y1 was immersed in an aqueous solution of potassium hydroxide having a specific gravity of 1.23 and a temperature of 30° C. such that cadmium oxide was converted to cadmium hydroxide. This gave an electrode plate Y2.

Subsequently, the electrode plate Y2 was immersed in the same mixed aqueous solution "S" as that of Example 1 and was dried to form resin layers 21 having a thickness of from 0.1 to 2 µm on the metallic nickel layers 24 of the electrode plate Y2. This gave a paste-type cadmium negative electrode "b".

Using the negative electrode "b", a known sintered-type nickel positive electrode, a polypropylene separator and an alkaline electrolyte, an SC-sized nickel cadmium storage battery "B" having a nominal capacity of 1.4 Ah was produced.

COMPARATIVE EXAMPLE 1

This comparative example used the electrode plate X2 produced in Example 1 as a paste-type cadmium negative electrode "c". Using the negative electrode "c", a known sintered-type nickel positive electrode, a polypropylene separator and an alkaline electrolyte, an SC-sized nickel cadmium storage battery "C" having a nominal capacity of 1.4 Ah was produced.

COMPARATIVE EXAMPLE 2

This comparative example used the electrode plate Y2 produced in Example 2 as a paste-type cadmium negative electrode "d". Using the negative electrode "d", a known sintered-type nickel positive electrode, a polypropylene separator and an alkaline electrolyte, an SC-sized nickel cadmium storage battery "D" having a nominal capacity of 1.4 Ah was produced.

COMPARATIVE EXAMPLE 3

The electrode plate X1 produced in Example 1 was immersed in an aqueous solution comprising 8 parts by weight of polyvinyl pyrrolidone (number average degree of polymerization: 1700), 2 parts by weight of polyvinyl alcohol (number average degree of polymerization: 1700) and 100 parts by weight of water and was dried to form resin layers having a thickness of from 3 to 8 µm on the surfaces of the electrode plate X1. This gave a paste-type cadmium negative electrode "e".

Using the negative electrode "e", a known sintered-type nickel positive electrode, a polypropylene separator and an alkaline electrolyte, an SC-sized nickel cadmium storage battery "E" having a nominal capacity of 1.4 Ah was produced.

As the alkaline electrolyte, an aqueous solution containing 30 wt % KOH was used also in batteries "B" to "E".

[Battery Evaluation]

(i) Cycle Life Test

Ten each of batteries "A" to "E" were charged at a current of 1.4 A in an atmosphere of 20° C. for 1.5 hours, left in an atmosphere of 20° C. for 8 hours, and discharged at a current of 1.4 A until the terminal voltage dropped to 1.0 V. This cycle was repeated, and the number of charge/discharge cycles at which the battery discharge capacity became 60% of the discharge capacity at the 1st cycle was obtained. This was judged to be the end of battery life.

Figure 3:
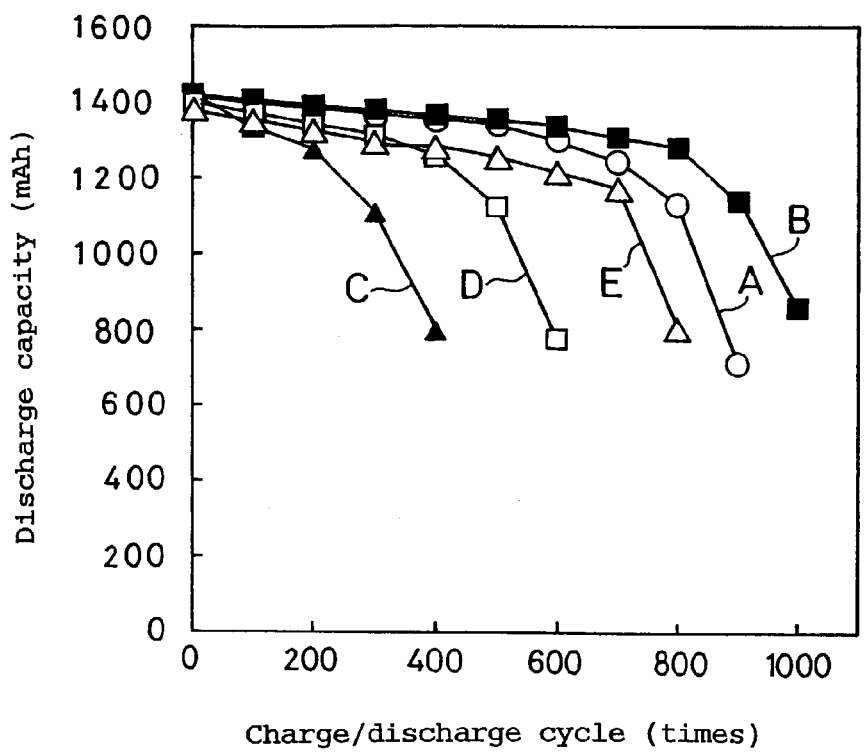
FIG. 3 is a graph showing the relation between the number of charge/discharge cycles and the discharge capacity in batteries "A" to "E".
Figure 4:
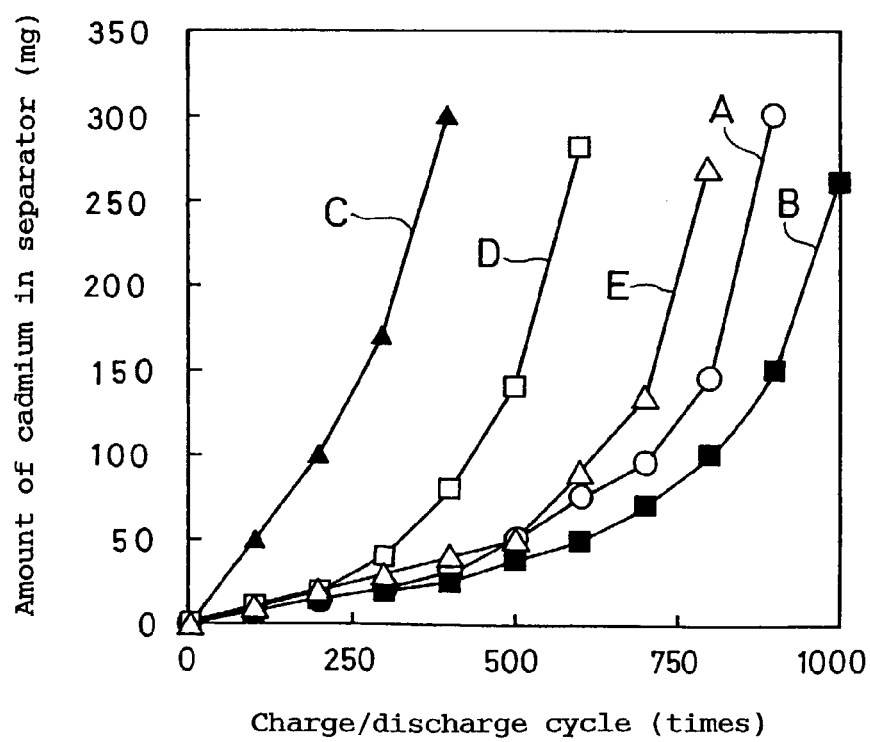
FIG. 4 is a graph showing the relation between the number of charge/discharge cycles and the amount of cadmium in separators in batteries "A" to "E".

The relation between the number of charge/discharge cycles and the battery capacity is shown in FIG. 3. Also, the batteries were disassembled every 100 cycles one by one, and the amount of cadmium in the separators was chemically analyzed. The results of the analysis are shown in FIG. 4. Incidentally, the reason for leaving the batteries for 8 hours after charging is to facilitate detection of minute short-circuit inside the batteries.

As shown in FIG. 3, the longest battery life was exhibited by battery "B" (870 cycles), followed by battery "A" (850 cycles), battery "E" (800 cycles), battery "D" (600 cycles) and battery "C" (400 cycles). When these batteries were judged to be at the end of their lives, they were disassembled and examined to find the cause. As a result, the cause was found to be internal short-circuit induced by the progress of the migration in any of the batteries. Also, FIG. 4 shows that cadmium which has dissolved into the electrolyte accumulates in the separators as the charge/discharge cycle proceeds.

The above results indicate that battery "C" has the shortest life because its negative electrode includes only the above-mentioned reinforcing material as a binder and therefore cadmium readily dissolves out of the negative electrode. As compared with battery "C", batteries "A", "B", "D" and "E" have an improved life because they have coats or films formed on the surfaces of the negative electrode. Among them, batteries "B" and "A" have a particularly improved life.

(ii) Charge/Discharge Characteristics

Respective batteries "A" to "E" were charged at a current of 1.4 A in an atmosphere of 20° C. for 1.5 hours, left in an atmosphere of 20° C. for 1 hour, and discharged at a large current of 10 A until the terminal voltage dropped to 0.8 V. The discharge curves of the batteries are shown in FIG. 5.

Figure 5:
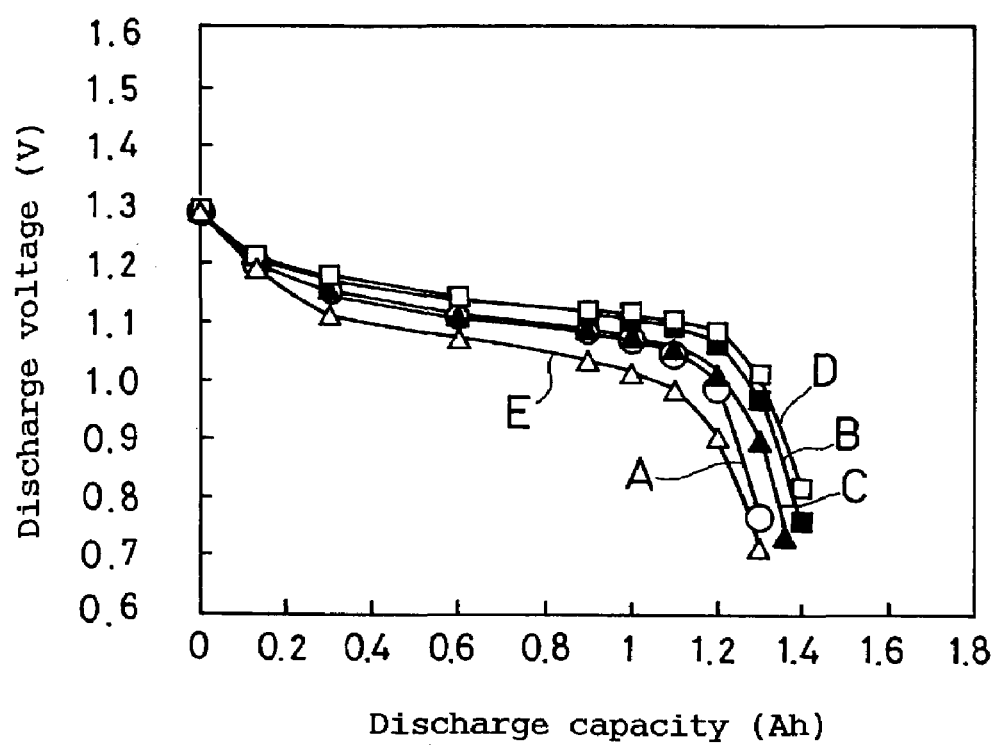
FIG. 5 shows discharge curves of batteries "A" to "E".

FIG. 5 shows that the battery voltage is high in batteries "B" and "D", followed by batteries "A" and "C". The voltage of battery "E" is much lower than the voltages of the other batteries. This may be ascribed to the thick, non-conductive resin layers coating the surfaces of the negative electrode material layers of battery "E". These resin layers are considered to have made the conductivity of the negative electrode surface lower in battery "E" than in batteries "A" to "D". Batteries "B" and "D" have a higher battery voltage presumably because they have porous metallic nickel layers in the vicinity of the negative electrode surfaces and therefore their negative electrode conductivities are higher than those of batteries "A" and "C".

As described above, according to the present invention, since the cadmium negative electrode has, on at least one surface thereof, a resin layer comprising polyvinyl pyrrolidone and a product of an addition reaction of a styrylpyridinium salt to polyvinyl alcohol, it is possible to suppress dissolution of cadmium into the alkaline electrolyte caused by charge/discharge cycles and provide a nickel cadmium storage battery having a long cycle life.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A cadmium negative electrode for a nickel cadmium storage battery,
    said electrode comprising an electrode plate and a resin layer coating at least one surface of said electrode plate,
    said electrode plate comprising a cadmium compound as an active material,
    said resin layer comprising polyvinyl pyrrolidone and a product of an addition reaction of a styrylpyridinium salt to polyvinyl alcohol.

2. The cadmium negative electrode in accordance with claim 1, further comprising a conductive layer between said electrode plate and said resin layer, said conductive layer comprising metallic nickel.

3. A method for producing a cadmium negative electrode for a nickel cadmium storage battery, said method comprising:
    a step (a) of producing an electrode plate comprising a cadmium compound as an active material;
    a step (b) of preparing an aqueous solution containing polyvinyl pyrrolidone and a product of an addition reaction of a styrylpyridinium salt to polyvinyl alcohol; and
    a step (c) of applying said aqueous solution onto at least one surface of said electrode plate or immersing said electrode plate in said aqueous solution.

4. The method for producing a cadmium negative electrode in accordance with claim 3, further comprising the step of forming a conductive layer on at least one surface of said electrode plate by electrolytic plating prior to said step (c), said conductive layer comprising metallic nickel.

5. A nickel cadmium storage battery comprising: a positive electrode comprising nickel; a negative electrode; a separator interposed between said positive electrode and said negative electrode; and an alkaline electrolyte,
    wherein said negative electrode comprises an electrode plate and a resin layer coating at least one surface of said electrode plate, said electrode plate comprising a cadmium compound as an active material, said resin layer comprising polyvinyl pyrrolidone and a product of an addition reaction of a styrylpyridinium salt to polyvinyl alcohol.

* * * * *